(No Model.) 2 Sheets—Sheet 2.

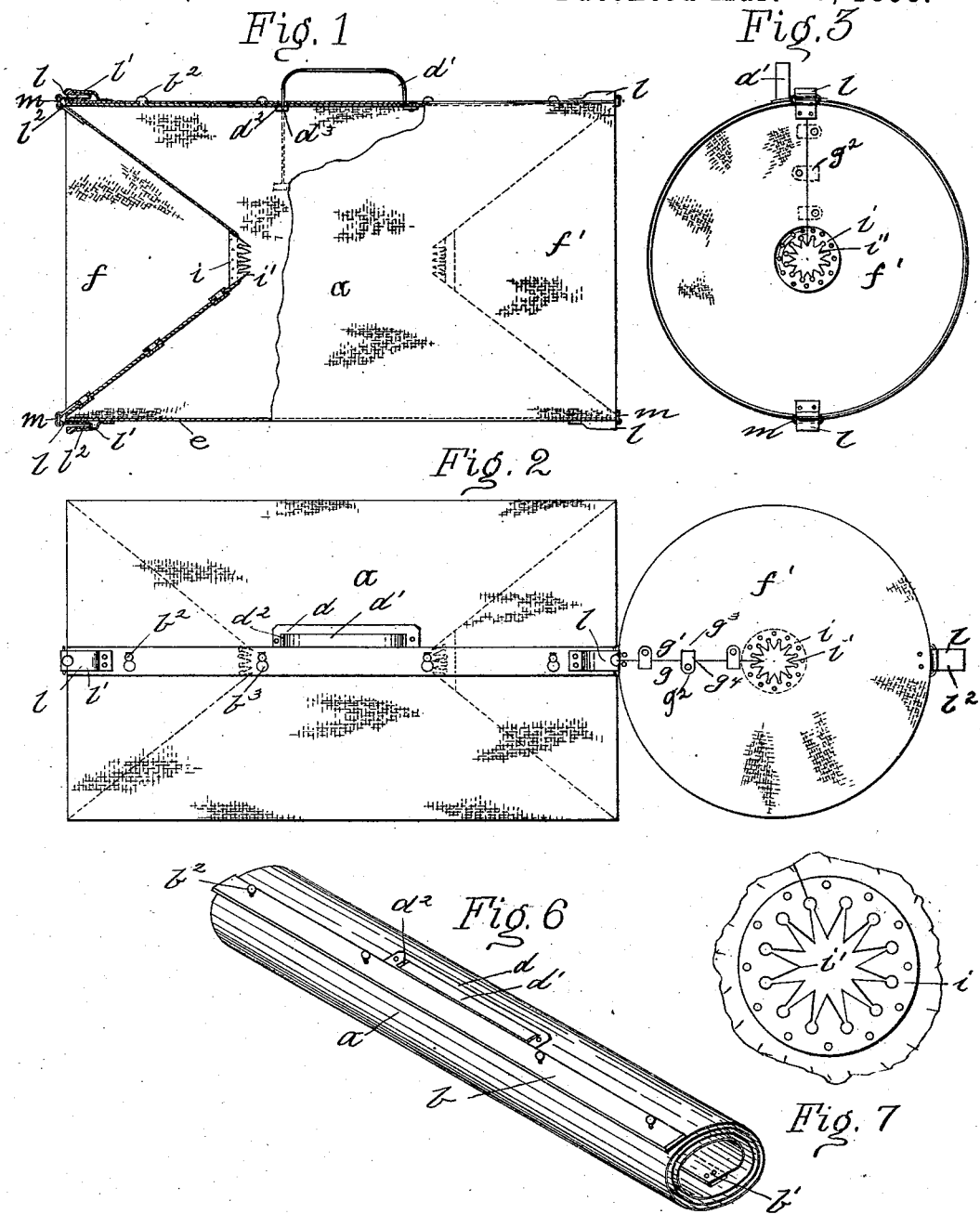

D. TUFTS.
MINNOW TRAP.

No. 535,966. Patented Mar. 19, 1895.

Witnesses
L. deB. Little
Robert C. Totten

Inventor
David Tufts
By Kay & Totten
Attorneys

UNITED STATES PATENT OFFICE.

DAVID TUFTS, OF PITTSBURG, PENNSYLVANIA.

MINNOW-TRAP.

SPECIFICATION forming part of Letters Patent No. 535,966, dated March 19, 1895.

Application filed October 12, 1894. Serial No. 525,671. (No model.)

*To all whom it may concern:*

Be it known that I, DAVID TUFTS, a resident of Pittsburg, in the county of Allegheny and State of Pennsylvania, have invented a new and useful Improvement in Minnow-Traps; and I do hereby declare the following to be a full, clear, and exact description thereof.

My invention relates to minnow or like traps, its object being to provide a trap in which the inlet may be regulated for the catching of different sized minnows, and one which when not in use can be folded up into a small and compact parcel.

To these ends my invention comprises certain improvements and combinations of parts, all of which will be fully hereinafter set forth and claimed.

To enable others skilled in the art to make and use my invention, I will describe the same more fully, referring to the accompanying drawings, in which—

Figure 4:
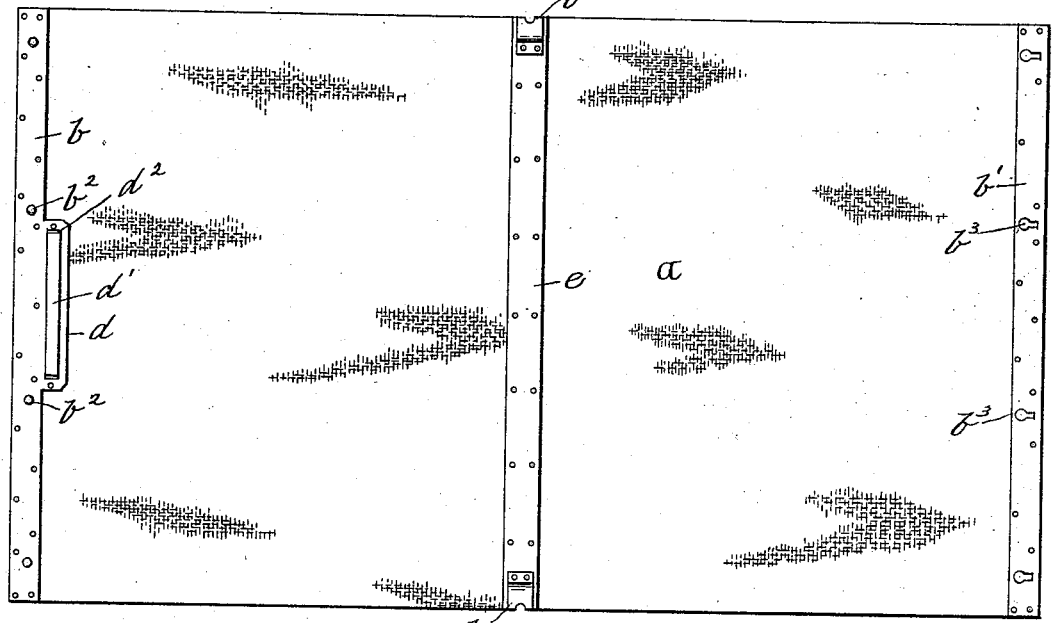
Figure 5:
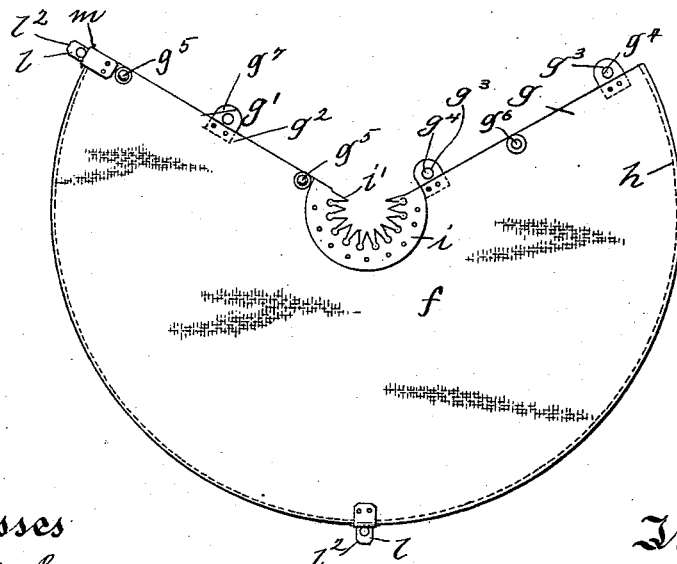

Figure 1 is a side view of my improved minnow trap ready for use. Fig. 2 is a top view thereof. Fig. 3 is an end view. Fig. 4 is a view of the main body portion opened out. Fig. 5 is a like view of one of the ends. Fig. 6 is a view of the trap folded. Fig. 7 is an enlarged view of the opening in one of the ends.

Like letters indicate like parts in each of the figures.

The letter $a$ designates the main body of the minnow trap which is composed of a flexible wire gauze or netting of suitable mesh. Such wire gauze or netting formed of brass is preferable as the rusting of the material is thereby avoided. The body portion $a$ has riveted or otherwise secured to the connecting edges thereof the strips $b$ $b'$, the strip $b$ having the pins $b^2$ thereon adapted to engage with the locking seats $b^3$ on the strip $b'$, whereby the said body portion $a$ may be brought to cylindrical form as shown in Fig. 1. The strip $b$ has the projection $d$ formed thereon, said projection $d$ having the handle $d'$ secured at one end thereof, the opposite end of said handle passing through a slot $d^2$ in said projection $d$. The end of said handle $d'$ passing through the slot $d^2$ has the enlargement $d^3$ thereon to prevent its withdrawal through the slot $d^2$. This handle when in the position shown in Fig. 1 prevents the locking seats $b^3$ in the strip $b'$ from slipping out of engagement with the pins $b^2$ of the strip $b$, and by depressing the handle and forcing it down through the slot $d^2$, until it is perfectly flat with the projection $d$, as shown in dotted lines, the locking seats $b^3$ can be thrown out of engagement with the pins $b^2$. That portion of the body $a$ which forms the ends thereof, when said body portion is brought to cylindrical form, may have a double selvage formed thereon, or may have a strip secured thereto to add rigidity to the body portion when brought to cylindrical form. The body portion is further provided with the rib $e$ extending across the same at about the middle thereof to add rigidity to the same.

The ends $f f'$ of the trap, as shown in Fig. 5, when opened out have substantially the appearance of sectors of a circle. These ends are constructed of the same material as the body portion, and along the connecting edges $g g'$ thereof are the well known fastening devices $g^2$ for holding said connecting edges together, when said ends $f f'$ are brought together to impart to said end pieces a conical form. For this purpose the edge $g$ has the lugs $g^3$ provided with the stud $g^4$, while the edge $g'$ has the seat $g^5$ for the reception of the stud $g^4$ and the lug $g^7$. In this manner the edges may be made to abut against each other, and connected without lapping. By pressing the stud into the seat $g^5$ a sufficiently secure connection is provided, yet at the same time one which may be readily released.

In order to stiffen the bases of the conical ends, the material is lapped over at the bases and a wire $h$ inserted. Any suitable form of a catch may be employed to connect the edges of said ends. Around the upper end or apex of the conical ends $f f'$ is the ring $i$, said ring having the prongs or tongues $i'$ projecting therefrom. The ring $i$ is preferably formed of metal so that the prongs $i'$ may be bent to enlarge or contract the opening leading into the trap. In this manner the size of the opening may be regulated according to the size of minnow which it is desired to entrap.

In order to secure the conical ends $f f'$ to the body portion $a$ I employ the catches $l$, said catches consisting of the seats $l'$ secured to the ends of the strip $b'$ and the rib $e$, while the conical ends have secured thereto the spring tongue $l^2$ adapted to enter the seat $l'$.

The said tongue is journaled on a hinge $m$ which is secured to the conical ends. This is a well known form of fastening device and is particularly applicable to my invention, for by releasing one of the fastenings, the conical end may be swung back on the other fastening in the manner of a hinge, when it is desired to open the trap, as shown in Fig. 2.

The trap is ready for use when the parts are secured together in the manner shown in Fig. 1, the prongs $i'$ of the rings $i$ having been adjusted so as to make the openings leading into the trap of such size as will readily permit of the entrance to the trap of a minnow of the size desired to be entrapped. Some crumbs of bread or other suitable bait are placed within the trap. When the trap is lowered into the water, the minnows will enter the openings in the ends of the trap and when once within the trap it is practically impossible for them to escape, for, if they attempt to pass out by said openings, they are likely to come in contact with the sharp ends of the prongs $i'$, which will cause them to retreat quickly from said openings. By having the prongs $i'$ constructed as shown, it is possible for the minnow to enter the trap without danger of being caught by the prongs, unless in getting part way in, they should attempt to withdraw, whereupon they would come into contact with the prongs which will only tend to make them advance entirely within the trap.

When it is desired to remove the minnows from the trap, the trap is withdrawn from the water and one of the fasteners at the end released so that one of the conical ends may be swung back on the other fastener as a hinge, whereupon the minnows entrapped can be removed from the trap.

When the trap is not in use and for convenience of carrying, it may be rolled up to the form shown in Fig. 6. This is done by removing the ends and opening them out by releasing the catches which secure them in said conical form, as shown in Fig. 5. The body portion is also opened out by drawing down the handle $d'$ until it is flat with the projection $d$, when the locking seats $b^3$ in the strip $b'$ can be released from the pins $b^2$. The ends and the body portion can then be folded up together as shown in Fig. 6, when the trap is in such shape as to be conveniently carried or packed in a valise or other traveling bag.

As the material of which the trap is constructed is very light, the weight of same is small.

What I claim as my invention, and desire to secure by Letters Patent, is—

1. A minnow or like trap having removable conical ends constructed of flexible material, releasable fastening devices along the connecting edges thereof, a flexible band around the apices of said conical ends, and a flexible tongue projecting from said band surrounding the opening leading to said trap and extending within the same, substantially as set forth.

2. A minnow or like trap having the body portion thereof constructed of flexible material, releasable fastening devices on the connecting edges of said body portion, removable conical end pieces of like flexible material, said end pieces having releasable fastening devices along the connecting edges thereof, whereby said end pieces may be opened out, substantially as set forth.

3. A minnow or like trap having removable conical ends constructed of flexible material, and releasable fastening devices along the connecting edges thereof, whereby said conical ends may be opened out, substantially as set forth.

4. A minnow or like trap constructed of flexible material, having pins and corresponding locking seats on the connecting edges thereof, and a movable handle at one side of and parallel with said connecting edges, and adapted to hold said pins in said locking seats, substantially as set forth.

5. A minnow or like trap constructed of flexible material having strips along the connecting edges thereof, pins on one of said strips, the other strip having corresponding locking-seats, a handle secured at one end and having the free end thereof passing down into said trap, an enlargement on the free end thereof, said handle being adjacent to said strips, whereby said handle holds said strips in engagement, substantially as set forth.

In testimony whereof I, the said DAVID TUFTS, have hereunto set my hand.

DAVID TUFTS.

Witnesses:
ROBT. D. TOTTEN,
ROBERT C. TOTTEN.